(12) United States Patent
Pellikaan

(10) Patent No.: US 6,389,656 B1
(45) Date of Patent: May 21, 2002

(54) CLIP, AS WELL AS WIRE/CLIP ASSEMBLY

(75) Inventor: Cornelis Pellikaan, De Lier (NL)

(73) Assignee: Agrarisch Loonbedrijf C. Pellikaan, Elsendorp (NL)

( * ) Notice: Subject to any disclaimer, the term of this patent is extended or adjusted under 35 U.S.C. 154(b) by 0 days.

(21) Appl. No.: 09/530,776

(22) PCT Filed: Nov. 4, 1998

(86) PCT No.: PCT/NL98/00635
§ 371 Date: May 4, 2000
§ 102(e) Date: May 4, 2000

(87) PCT Pub. No.: WO99/22587
PCT Pub. Date: May 14, 1999

(30) Foreign Application Priority Data

Nov. 4, 1997 (NL) .............................................. 1007438

(51) Int. Cl.[7] .............................................. A01G 17/04
(52) U.S. Cl. .......................... 24/326; 24/457; 24/552; 24/564; 47/44
(58) Field of Search .................... 24/67.9, 546, 547, 24/DIG. 10, 67 R, 67.3, 37.5, 551–554, 545, 557, 564, 457, 565; 47/44, 46; 248/62; D19/65; D8/395

(56) References Cited

U.S. PATENT DOCUMENTS

| | | | |
|---|---|---|---|
| 731,960 A | * | 6/1903 | Sherman |
| 926,274 A | * | 6/1909 | Meneray |
| 3,050,905 A | * | 8/1962 | Vlaeminck |
| 3,140,519 A | * | 7/1964 | Johnson |
| 3,302,328 A | * | 2/1967 | King |
| 3,878,590 A | * | 4/1975 | Bolger |
| 4,653,716 A | | 3/1987 | Sakaguchi |
| 5,090,097 A | * | 2/1992 | Koester, Jr. et al. |
| 5,159,731 A | * | 11/1992 | Dereadt |
| 5,542,209 A | | 8/1996 | Sheu |

FOREIGN PATENT DOCUMENTS

| | | |
|---|---|---|
| EP | 0494482 A1 | 7/1992 |
| GB | 205237 | 10/1923 |
| GB | 853558 | 11/1960 |
| JP | 5003728 | 1/1993 |
| JP | 7099841 | 4/1995 |

\* cited by examiner

Primary Examiner—James R. Brittain
(74) Attorney, Agent, or Firm—Young & Thompson

(57) ABSTRACT

Clip (1) which is to be attached to a wire (2) and is designed to clamp a part which is to be clamped in a first enclosure. A second enclosure is delimited by the free ends of the clip (1), which are bent in the shape of a C. This second enclosure for receiving the wire (2) becomes smaller as the area within which the stem is accommodated becomes larger.

6 Claims, 2 Drawing Sheets

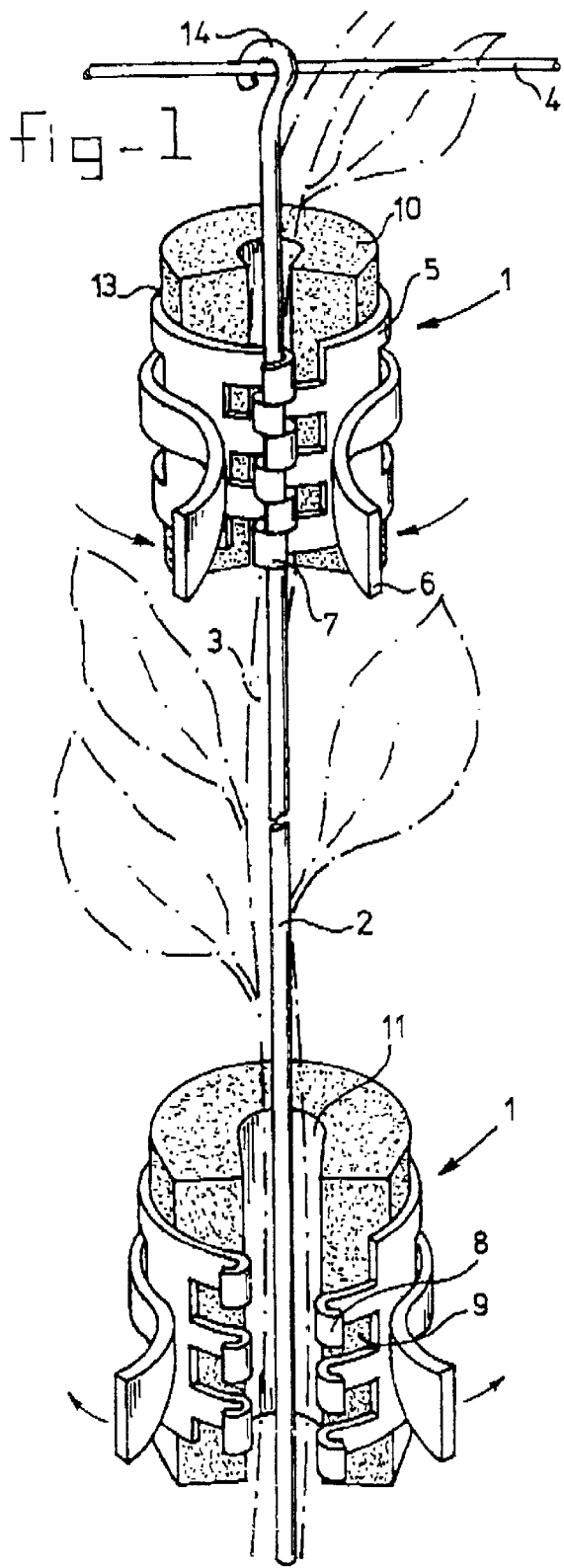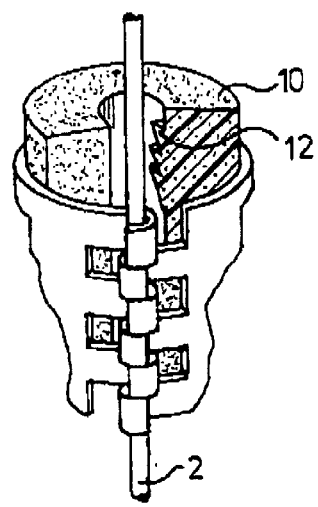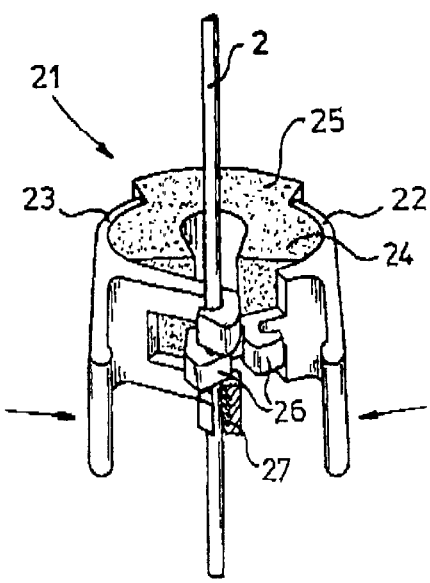

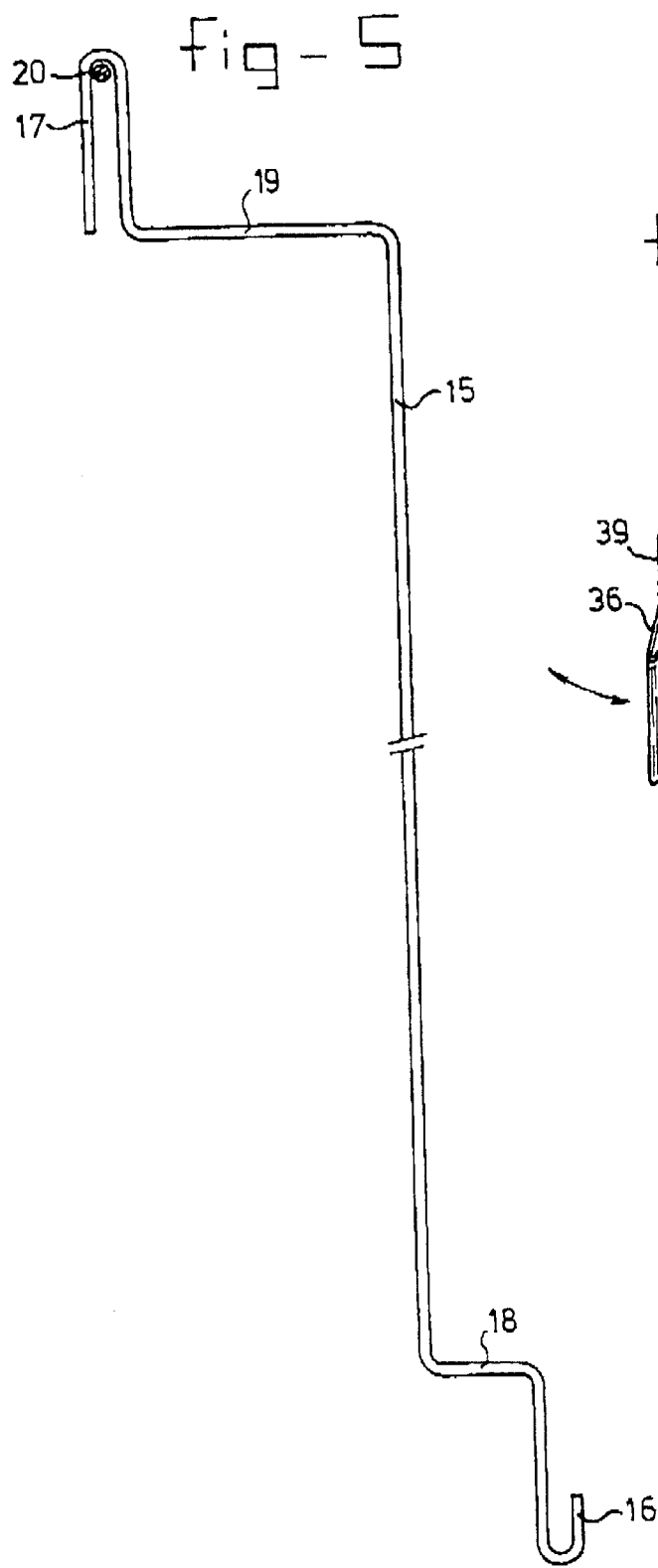
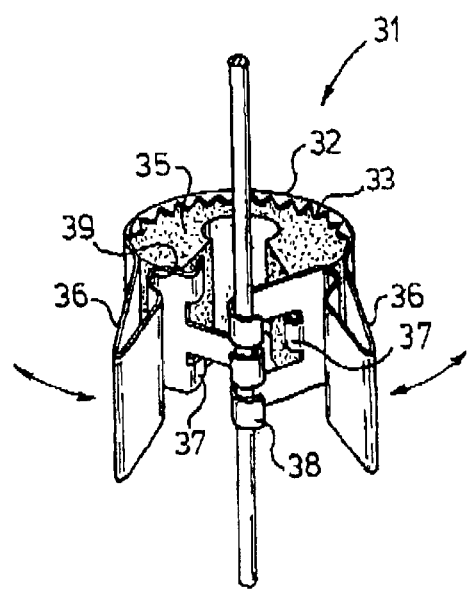

CLIP, AS WELL AS WIRE/CLIP ASSEMBLY

The present invention relates to a clip.

A clip of this type is generally known and is used for all kinds of applications. The present invention relates in particular, but not exclusively, to a plant clip. A clip of this nature is described in British Patent 853,558. The structure shown in that patent is composed of a wire material and is intended to delimit an enclosure within which a plant stem can move freely, while the second enclosure can be attached to a support stick, such as a bamboo cane.

A device of this nature is suitable for positioning the stem of a plant in the horizontal plane, i.e. for preventing plants from falling over.

However, if a plant or some other product is to be supported by the clip, it is necessary for the clip, and more particularly the first enclosure, to engage fixedly around the plant so as to clip it in place in order to be able to support (some of) the weight of the plant. The structure which is described in British patent 853,558 is entirely unsuitable for this purpose. This is because if the first enclosure were to be dimensioned so as to engage around the plant so as to jam it in place, the plant would be damaged to an unacceptable extent when carrying out the movement enabling the second enclosure to move along the support structure. Moreover, in the structure according to British patent 853,558 there is a risk of the clip rotating during use, because wire material is exerting a force on the support part in two planes lying one above the other. According to the British patent this is to some extent avoided by attaching all kinds of locking structures, but in practice these locking structures have been found not to provide adequate protection against tilting.

The object of the present invention is to provide a clip which makes it possible not only to clip the second enclosure securely to the support but also to clip the first enclosure securely onto the part which is to be positioned, such as a part of a plant.

The object of the present invention is to avoid the drawbacks mentioned above. This object is achieved by means of a clip as described above.

U.S. Pat. No. 4,653,716 has disclosed a clip device for a tennis racket. This device comprises two semi-circular parts in which an elastic material is arranged. The semi-circular parts are brought together via a snap-action structure and are locked together with the aid of a "toggle". Consequently, there is no possibility of attaching this to a wire or any other support. The actual clamping force is provided by the "toggle". A component of this nature is expensive to produce and is complicated to operate.

According to the invention, optimum clamping of the plant part or other part is provided by the fact that the inside of the moveable parts which delimit the first enclosure is provided with an elastic material. Naturally, it is also possible for these moveable parts themselves to consist of a resilient material of this nature. As a result, it is possible, on the one hand, to clamp in plant parts of different diameter and, on the other hand, to move the moveable parts beyond the actual clamping position in order, in this way, to create an opening for receiving the support, such as a wire. Since this action involves a considerable physical effort, wing-like extensions which run from the moveable parts which delimit the first enclosure are provided. These wing-like extensions wake the clip easy to install but in no way impair the clamp in use. A particularly compact structure is obtained if these wing-like extensions extend from the moving parts which delimit the first enclosure towards the moving parts which delimit the second enclosure, i.e. (part of) the second enclosure is situated between these wing-like extensions.

The resilient elastic material described above may be any material which is known from the prior art, such as a foamed plastic. It is also possible to arrange elastically deformable ribs on the moveable parts. In this way, it is possible to accommodate variations in diameter of the plant stem which lie within a certain range and to avoid locally excessive pressure on the stem. If the variations are excessively high, it is, of course, necessary to use plant clips of different active diameter. This resilient material, which may be a foam material, is in principle the only part which is in contact with the plant stem. By replacing only this foam material after the plant clip according to the invention has been used, replacement costs for these clips remain low, while the risk of germs and the like being transmitted is largely avoided. The user merely has to replace the resilient elastic part.

According to a further embodiment of this structure, the connecting part where the imaginary hinge point of the plant clip lies is designed so as to consist only of the said resilient material. As a result, the remaining parts can be relatively rigid and the pivoting movement can be optimized.

If a plant clip with a relatively rigid wire is used, it is important, in the event of high levels of load caused by the plant, for it to grip a wire of this nature well. In order to allow the spring force realized by the resilient nature or the plant clip to act even more effectively, it is proposed to arrange barbs in the C-shaped parts which delimit the second enclosure. By suitably arranging the plant clip according to the invention, it is possible to move this clip along a wire when such a wire is pulled upwards as a result of it being attached, for example, to horizontal plant wires in a greenhouse. If, by way of example, two plant clips according to the invention are used, it is possible to remove the bottom plant clip as the plant grows, to move the wire to which these plant clips are attached upwards, sliding this wire along the top plant clip, which then becomes the bottom plant clip, and then to allow the removed plant clip to act as the top plant clip. Moreover, it is possible to arrange barbs in the first enclosure, which barbs act in the axial direction, provide the plant with further support and prevent it from subsiding out of the clip without the overall pressure on the stem increasing too much. In practice, it has been found that a local increase in pressure of this nature does not have any real adverse effect on the plant.

According to an advantageous embodiment, at least three "teeth" are present in order for the support, such as a wire or stick, to engage between them. In this case, two of these teeth are arranged on one of the moveable parts, an opening being left between these teeth in order to receive the other tooth so as to delimit the second enclosure.

The invention will be explained in more detail below with reference to exemplary embodiments which are depicted in the drawing, in which:

FIG. 1 shows two plant clips according to the invention in combination with a wire and a plant stem;

FIG. 2 shows one of the plant clips in accordance with FIG. 1, partially in cross section;

FIG. 3 shows a further design of the plant clip according to the invention;

FIG. 4 shows a metal variant of the plant clip according to the invention; and

FIG. 5 shows a further design of a wire to which the clip is to be attached.

In FIG. 1, the plant clip according to the invention is denoted overall by 1. In the embodiment shown in this figure, two such plant clips 1 are shown, arranged on or in the vicinity of a wire 2. This wire is provided at the end with an eyelet 14 which is intended to be suspended from a horizontal plant wire 4 which is present, for example, in a greenhouse and can be moved upwards as the plant grows.

The stem of this plant, to which the clips 1 are attached, is denoted by 3. Each clip comprises an outer part 5 comprising two side parts (not indicated in more detail) and a connecting part 13 lying between them. The enclosure for the plant stem is denoted by 11. On the front side, the clip is extended by two wings 6, while the free ends comprise parts 8 which have been bent over in the shape of a C. These parts are offset with respect to one another and the opposite free end is provided, at the location of a bent-over part 8 with a recess 9. A piece of resilient material 10 is accommodated inside outer part 5. This material may consist of foam rubber and is elastically deformable. If it has a cellular structure, the cells are preferably closed in order, on the one hand, to obtain a smooth surface which is in contact with the stem 3 and, on the other hand, to prevent the penetration of moisture and other substances from the stem. As can be seen from FIG. 2, one or more resilient tongues 12 may be arranged in the foam part 10, which tongues provide extra grip for the stem and, in particular, prevent it from sliding downwards. As is apparent from a comparison of the top and bottom plant clips 1 shown in FIG. 1, moving the free ends towards one another and moving the bent-over parts 8 past one another creates a space for accommodating wire 2. After the wings 6 have been pinched inwards in the direction indicated by the arrows in FIG. 1, they are released so that part 5 springs back, gripping the wire 2 inside it.

The fact that a number of bent-over parts 8 are arranged alternately means that there will be no tilting moment when wire 2 is accommodated between them. A tilting moment of this nature would be produced if only two bent-over parts were to be moved towards the wire from opposite directions and were to engage around this wire.

If the length of the plant stem 3 increases as a result of growth, it is necessary to move the clips. In the design described above, this can be achieved in a particularly simple manner. The bottom clip 1 is removed from the plant and the wire. Then, horizontal wire 4 is moved upwards, bringing wire 2 with it, while holding the top plant clip 1 in place so that it, as it were, slides downwards along the plant wire 2. If the top clip 1 has moved downwards, the bottom clip 1 can then be attached again in order to act as the top clip 1, etc. In this way, it is only necessary to remove one plant clip when moving the horizontal wires 4.

As an alternative to the vertical movement, it is also possible to move the wire 2, together with the clips, along wire 4 in the horizontal direction. If desired, this movement may be combined with the vertical movement. To do this, the top end of wire 2 may be connected, via a hook, to wire 4, so that wire 2 is able to pivot easily.

Moreover, it is possible to provide the underside of wire 2 with a part which is bent back upwards, with the result that the clip cannot slide off without gripping the wires. This provides the possibility of arranging a compression spring on the underside of the wire, which spring cushions the plant clip when it slides downwards along the wire 2. It may suddenly slide downwards when, for example, tomatoes are being picked.

FIG. 3 shows a further embodiment of the invention. This embodiment is denoted overall by 21 and the outer part comprises two side parts 22, 23 which are connected by a connecting part 25. Connecting part 25 is integral with the inner part 24 and may consist of foam material. This means that, in contrast to the design in accordance with FIG. 1 in which the resilience is effected over the entire circumference of the outer part 5, the "pivot point" now lies more clearly at the connecting part 25.

It is also possible for the clip to be widened by the parts 22, 23, which are connected to the foam material 25, being moved apart. The foam material may, in a general context, i.e. also in the other design described above, have a varying thickness in order to be able to provide for it to fold round in an optimum manner. In the designs described with reference to FIGS. 1 and 2, it may be advantageous for the foam material to be slightly thinner in the centre, in order to prevent it from being folded double when the plant part is enclosed.

In the design illustrated in FIG. 3, the outer part 22 is provided with a number of bent-over parts 26, while the opposite part is provided with only one such part. In this way, it is possible to accommodate a variation in the thickness of the stem. In order to engage on the wire 2, the single bent-over part is provided with barb parts 27, which in this position make it possible for the plant clip 21 to move downwards with respect to the wire 2 but make upwards movement difficult or impossible.

The outer part of the plant clip 5 or 22, 23 described above may be made from any material which is known in the prior art and in any known way. It may be a metal or plastic part and may be produced by blanking, injection-moulding and the like. The resilient inner part may also comprise any plastic material which is known in the prior art.

FIG. 4 shows a perspective view of a metal variant of the plant clip according to the invention, in the folded-open position. This clip is denoted overall by 31 and comprises, for example, a stainless steel material. It should be understood, however, that it may also be made from any other material which is known in the prior art and is preferably a metal material, although a plastic material is not by definition excluded.

In this embodiment, the wings are denoted by 36 while the central part 32 is provided with inwardly facing tooth in 34 for accommodating a piece of foam material 35 between this toothing. Further toothing is denoted by 37 and is arranged on the bent-over parts 38. A recess 39 is arranged in each case between the bent-over parts 38 and the wings 36. Recess 39 on the left-hand side is used to control the bent-over part 38, i.e. it has a locating effect. A design of this nature is easy to produce by blanking.

FIG. 5 shows a further attachment wire, which is denoted overall by 15. This wire is provided with two bent-over ends 16 and 17 as well as two angled-off parts 18 and 19. The end 17 which is bent-over in the manner of a hook is used to engage on a horizontal wire 20 which can be used in greenhouses and the like. A grow string, for example, may be attached to the bent-over end 16. The clip described above is to be attached to that part of wire 15 which lies between the angled-off parts 18 and 19. In this case, the angled-off part 19 is used to provide a distance between wire 20 and the plant which is to be attached to the clip. This angle off part 19 can also be used to grip the attachment wire 15, whether or not it is provided with a plant. The bent-over part 18 is used to form a stop, so that the clip cannot fall off wire 15. If appropriate, this bent-over part 18 may be replaced by a limit stop or the like which is arranged on the long straight part of attachment wire 15 and makes it possible to dispense with parts 18 and 16. The length of wire 15 corresponds to the maximum length for which the plant can stand on its own, i.e. without further support.

In a first phase of growth, the end of the plant is attached to the underside of wire 15, in the vicinity of the angled-off part 18, using a clip as described above. It is also possible to attach the wire to the top side, i.e. in the vicinity of part 19, without using the clip according to the invention. In this case, the plant will hang at a slight angle with respect to the vertical in the vertical plane which is delimited by wire 20. As the plant grows further, wire 15 is pushed along wire 20, with the result that more space is produced for the plant. Moreover, the clip can be moved along the part which lies between bent-over parts 18 and 19. It is also possible to extend part 17 in the upwards direction, in such a manner that it is not possible to remove wire 20 in a simple manner, but rather a further action is required (locking).

The clip described above is of particularly simple design and its cost price may be comparatively low. Moreover, it is simple to attach.

It is to be understood that the clip can be used for any type of plant, such as (vine) tomatoes, cucumbers, capsicums, aubergines, peppers and the like, but also for attaching other non-living objects.

It will be clear to the person skilled in the art that numerous modifications may be made to this clip shown above without departing from the scope of the present application as described in the claims.

What is claimed is:

1. Clip which is to be attached to a wire or the like, comprising, in the fitted position, two adjoining enclosures, a first enclosure for receiving said wire or the like to be clamped and a second enclosure for accommodating the said wire or the like, each enclosure comprising two parts which can move resiliently with respect to one another and the first enclosure comprising a common connecting part, in which clip the first enclosure is arranged closer to the said connecting part and the second enclosure comprises C-shaped parts which are arranged on the ends of the moveable parts of the first enclosure, in such a manner that when they are moved towards one another the C-shaped parts move past one another, in order to delimit the said second enclosure, the area of which increases if the area of the first enclosure decreases, and vice versa, wherein wing-like extensions extend from the moveable parts which delimit the first enclosure in the direction towards the said second enclosure, these extensions being arranged in such a manner that when they are moved towards one another after delimiting said first enclosure, the moveable parts which delimit the second enclosure are moved away from one another, and that the inside of the moveable parts which delimit the first enclosure is provided with elastically deformable material, wherein at least one of the two C-shaped parts of the second closure is formed of a further two C-shaped parts which lie at a distance from one another with a recess between them, allowing the other C-shaped parts to be accommodated between the said two C-shaped parts.

2. Clip according to claim 1, in which said elastically deformable material comprises the connecting part.

3. Clip according to claim 1, in which the said C-shaped parts are provided with barbs which act in the axial direction.

4. Clip according to claim 1, in which the said first enclosure is provided with barbs which act in the axial direction.

5. Clip according to claim 1, wherein said clip is a plant clip.

6. Wire/clip assembly, comprising a plant clip according to claim 5, as well as a wire, which wire is provided with suspension means.

* * * * *